United States Patent
Hsu et al.

(10) Patent No.: US 9,477,219 B2
(45) Date of Patent: Oct. 25, 2016

(54) DYNAMIC COMPENSATION IN ADVANCED PROCESS CONTROL

(75) Inventors: Chih-Wei Hsu, Chuang-Hua (TW); Jin-Ning Sung, Pingjhen (TW); Shin-Rung Lu, Chu-Pei (TW); Jong-I Mou, Hsinpu Township, Hsinchu County (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 1790 days.

(21) Appl. No.: 12/731,348

(22) Filed: Mar. 25, 2010

(65) Prior Publication Data

US 2011/0238197 A1 Sep. 29, 2011

(51) Int. Cl.
*G05B 19/418* (2006.01)

(52) U.S. Cl.
CPC ......... *G05B 19/41875* (2013.01); *G05B 2219/32017* (2013.01); *G05B 2219/32189* (2013.01); *G05B 2219/45031* (2013.01); *Y02P 90/22* (2015.11)

(58) Field of Classification Search
USPC ............ 700/110, 121, 104; 438/14, 10, 5; 257/E21.525
See application file for complete search history.

(56) References Cited

U.S. PATENT DOCUMENTS

| | | | |
|---|---|---|---|
| 6,625,512 B1 * | 9/2003 | Goodwin | 700/121 |
| 7,271,480 B2 | 9/2007 | Chang et al. | |
| 7,797,073 B1 * | 9/2010 | Pasadyn et al. | 700/121 |
| 2004/0040001 A1 * | 2/2004 | Miller et al. | 438/10 |
| 2004/0059456 A1 * | 3/2004 | Bode et al. | 700/121 |
| 2006/0007453 A1 * | 1/2006 | Horak et al. | 700/121 |

OTHER PUBLICATIONS

Chinese Patent Office, Office Action dated Mar. 19, 2012, Application No. 201010192832.X, 5 pages.
Unpublished U.S. Appl. No. 13/286,337, filed Nov. 1, 2011 entitled "Multi-Factor Advanced Process Control Method and System for Integrated Circuit Fabrication", 30 pages.

* cited by examiner

*Primary Examiner* — Sean Shechtman
*Assistant Examiner* — Steven Garland
(74) *Attorney, Agent, or Firm* — Haynes and Boone, LLP

(57) ABSTRACT

A method of semiconductor fabrication is provided. The method includes providing a model for a device parameter of a wafer as a function of first and second process parameters. The first and second process parameters correspond to different wafer characteristics, respectively. The method includes deriving target values of the first and second process parameters based on a specified target value of the device parameter. The method includes performing a first fabrication process in response to the target value of the first process parameter. The method includes measuring an actual value of the first process parameter thereafter. The method includes updating the model using the actual value of the first process parameter. The method includes deriving a revised target value of the second process parameter using the updated model. The method includes performing a second fabrication process in response to the revised target value of the second process parameter.

20 Claims, 2 Drawing Sheets

DYNAMIC COMPENSATION IN ADVANCED PROCESS CONTROL

TECHNICAL FIELD

The present disclosure relates generally to semiconductor fabrication, and more particularly, to semiconductor fabrication process control.

BACKGROUND

As performance requirements and throughput demands increase, semiconductor fabrication process control has become increasingly crucial. However, as process geometries decrease, such as from 65 to 45 nanometer and beyond, it may be challenging to keep process variations at acceptable levels. As such, the processes may suffer from losses in tool productivity, increased operator interaction, yield loss, and higher rework rates, all possibly leading to higher costs. Advanced Process Control (APC), which may consist of models and feedback systems among other process control techniques, has been widely used to help alleviate some of the variations.

APC techniques generally have multiple processing stages. A problem with existing APC techniques is that they typically assume that the performance targets associated with each processing stage will be achieved at the end of each processing stage. In other words, the existing APC techniques typically do not take into account drifts that occur during processing. In reality, each processing stage may contain a certain amount of processing drift. Over time, the processing drifts will accumulate and may cause substantially deviations to a final performance target of the APC process.

Consequently, although existing APC techniques have been generally adequate for their intended purposes, they have not been entirely satisfactory in all respects.

SUMMARY

One of the broader forms of an embodiment of the present disclosure involves a method that includes, providing a model for a device parameter of a wafer as a function of first and second process parameters, the first and second process parameters corresponding to different wafer characteristics, respectively; deriving target values of the first and second process parameters based on a specified target value of the device parameter; performing a first fabrication process in response to the target value of the first process parameter; thereafter measuring an actual value of the first process parameter; updating the model using the actual value of the first process parameter; deriving a revised target value of the second process parameter using the updated model; and performing a second fabrication process in response to the revised target value of the second process parameter.

Another one of the broader forms of an embodiment of the present disclosure involves a method of fabricating a semiconductor device. The method includes, determining a target value of a first parameter based on a target value of a second parameter; operating a first fabrication tool in response to the target value of the first parameter; thereafter measuring an actual value of the first parameter; determining a target value of a third parameter based on the target value of the second parameter and the actual value of the first parameter; and operating a second fabrication tool in response to the target value of the third parameter; wherein the second parameter is a function of the first and third parameters.

Yet another one of the broader forms of an embodiment of the present disclosure involves a system for semiconductor fabrication. The system includes, a modeling module that establishes a model for a device parameter of a wafer, the model being a function of first and second process parameters that correspond to respective different wafer characteristics, the model deriving target values of the first and second process parameters based on a specified target value of the device parameter; a first process tool coupled to the modeling module, the first process tool performing a first fabrication process in response to the target value of the first process parameter; a metrology tool coupled to the first process tool and the modeling module, the metrology tool measuring an actual value of the first process parameter; a second process tool coupled to the modeling module, the second process tool performing a second fabrication process in response to a revised target value of the second process parameter; wherein the revised target value of the second process parameter is derived by the modeling module based on the actual value of the first process parameter.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The present disclosure relates generally to the fabrication of semiconductor devices, and more particularly, to process control of the fabrication of semiconductor devices. It is understood, however, that specific embodiments are provided as examples to teach the broader inventive concept, and one of ordinary skill in the art can easily apply the teaching of the present disclosure to other methods or apparatus. Also, it is understood that the methods and apparatus discussed in the present disclosure include some conventional structures and/or processes. Since these structures and processes are well known in the art, they will only be discussed in a general level of detail. Furthermore, reference numbers are repeated throughout the drawings for sake of convenience and example, and such repetition does not indicate any required combination of features or steps throughout the drawings.

Figure 1:
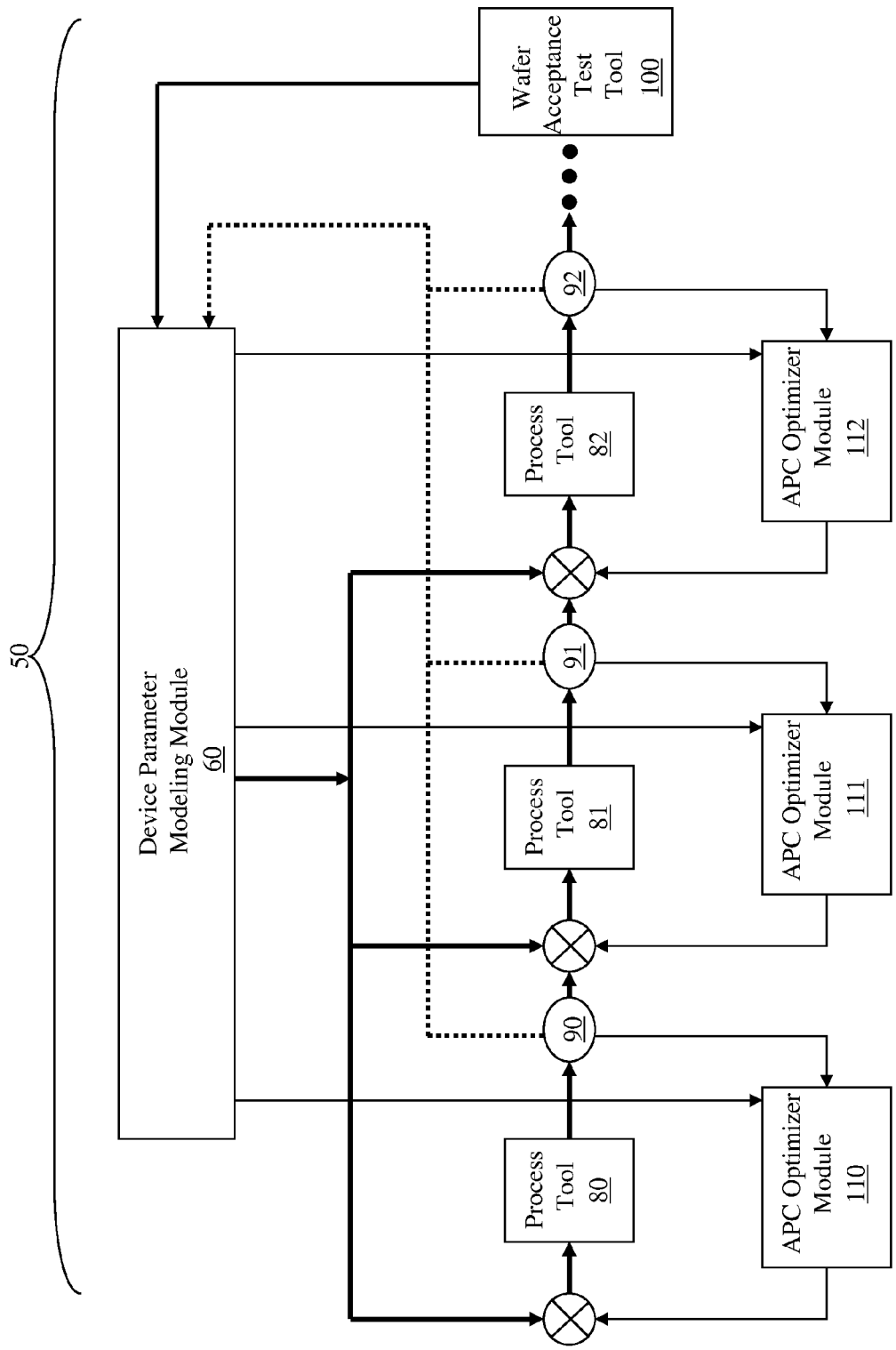
FIG. 1 is a block diagram illustrating a system in which various embodiments disclosed herein are implemented.

FIG. 1 is a diagrammatic view of an Advanced Process Control (APC) system 50. The APC system 50 includes a device parameter modeling module 60, process tools 80, 81, and 82, metrology tools 90, 91, and 92, a wafer acceptance test tool 100, and APC optimizer modules 110, 111, and 112. The device parameter modeling module 60 includes one or more computers encoded with computer programs that construct a model for a device parameter as a function of one or more process parameters. In an embodiment, the device parameter is a parameter that measures an electrical characteristic of a semiconductor device. For example, the device parameter may be a saturation drain current ($I_{dsat}$) for a metal-oxide semiconductor (MOS) transistor. As another example, the device parameter may be a threshold voltage (Vt) of a MOS transistor. Other examples of the device parameter may include a trans-conductance ($G_m$) or trans-resistance ($R_m$) of a MOS transistor or of a bipolar transistor. It is understood that these electrical device parameters merely serve as examples, and that additional device parameters exist but are not mentioned herein for the sake of simplicity.

Alternatively, the device parameter may be expressed in percentage terms as a measurement of uniformity with respect to one of the above electrical parameters. As an example, a device parameter may be saturation drain current uniformity, which is expressed as the saturation drain current of a MOS transistor divided by a target (or average) saturation drain current. In other words, $I_{dsat}$ uniformity=$I_{dsat}$/$I_{dsat\_target}$.

The process parameters are parameters associated with various semiconductor fabrication processing stages used to carry out the fabrication of a semiconductor device. In an embodiment, the process parameters are parameters that measure physical characteristics of a semiconductor device at or near the completion of each fabrication processing stage. As an example, with respect to a MOS transistor, the process parameters may include active region critical dimension (OD_CD), shallow trench isolation step height (STI_SH), polysilicon region critical dimension (POLY_CD), offset spacer width critical dimension (OSW_CD), rapid thermal annealing temperature (RTA), gate oxide thickness, or pocket implant dose (PKT_IMP). It is understood that these process parameters merely serve as examples, and that additional process parameters exist but are not mentioned herein for the sake of simplicity.

In semiconductor fabrication, a correlation exists between a desired device parameter (or device parameter of interest) and the process parameters associated with the fabrication processing stages that are performed. Based on this correlative relationship, the device parameter modeling module 60 constructs a mathematical model to express the device parameter as a function of the process parameters. As an example:

$$DP=a_1*P+a_2*P_2+a_3*P_3+\ldots+a_1*P_n+b$$

where DP represents the device parameter, $P_1$ through $P_n$ each represent a different process parameter, $a_1$, $a_2$, and $a_3$ are the respective linear coefficients of the process parameters $P_1$ through $P_n$, and b is a constant. In this example, the device parameter DP has a linear relationship with the process parameters $P_1$ through $P_n$.

In one embodiment, for a 45-nanometer process, the device parameter DP of interest is saturation drain current uniformity in a N-type MOS transistor (NMOS). $P_1$ is polysilicon region critical dimension, $P_2$ is offset spacer width, $P_3$ is sidewall critical dimension, $P_4$ is rapid thermal annealing temperature, $P_5$ is gate oxide thickness, $P_6$ is pocket implant dose. $a_1$ through $a_6$ have values of 2.0, 4.6, 3.0, 1.7, 6.0, and 2.3, respectively. In another embodiment, for a 45-nanometer process, the device parameter DP is saturation drain current uniformity in a P-type MOS transistor (PMOS), $P_1$ through $P_6$ represent the same process parameters as in the NMOS embodiment above, $a_1$ through $a_6$ have values of 3.0, 8.6, 5.0, 1.3, 1.6, and 4.5, respectively.

Another example of the modeling equation may be expressed as follow:

$$DP=f_1(P_1)+f_2(P_2)+f_3(P_3)+\ldots+f_n(P_n)+b$$

In this example, each of the functions $f_1(P_1)$ to $f_n(P_n)$ may be linear or non-linear. As such, the device parameter DP may have a non-linear relationship with the process parameters $P_1$ through $P_n$.

Based on the device modeling equations provided above, when a target value for the device parameter is specified, the target values of the process parameters can be calculated. It is understood that more than one set of target values of the process parameters exist. For example, a process engineer may specify different target values for one or more of the process parameters, as long as the target values of other process parameters are also calculated to take this into account in a manner such that the target value of the device parameter can still be achieved. This concept may be referred to as compensation and will be discussed in more detail below.

In the embodiment illustrated in FIG. 1, the device parameter is the saturation drain current $I_{dsat}$. A target value of $I_{dsat}$ may be set by a process engineer or by product specification requirements. Based on the target value of $I_{dsat}$, the device parameter modeling module 60 calculates a set of initial target values for three process parameters that are OD_CD, STI_SH, and POLY_CD, respectively. The device parameter modeling module 60 outputs the initial target values of these process parameters to process tools 80, 81, and 82, respectively.

The process tools 80, 81, and 82 are operable to perform respective semiconductor fabrication processes, where different physical characteristics of the wafer after being processed by the process tools are measured as respective process parameters. Each of the process tools 80-82 may include one or more semiconductor fabrication tools, such as photolithography tools, etching tools, chemical vapor deposition (CVD) tools, physical vapor deposition (PVD) tools, atomic layer deposition (ALD) tools, chemical mechanical polishing (CMP) tools, furnaces, as well as the necessary computers and controllers that are associated with the tools. For the sake of simplicity and clarity, only three process tools 80-82 are shown in FIG. 1, and the details of each process tool are not illustrated herein. However, it is understood that the APC system 50 may include additional process tools used in other processing stages that may occur before, after, or in between the processing stages associated with the process tools 80-82.

Figure 2:
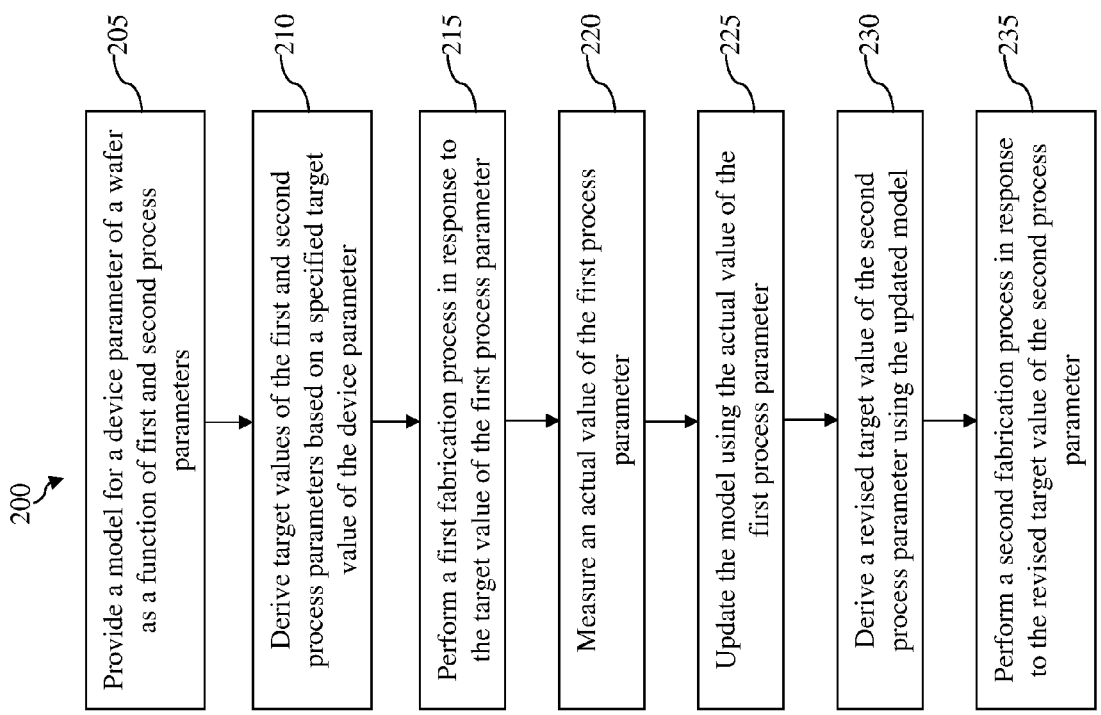
FIG. 2 is a block diagram illustrating part of a semiconductor fabrication process flow according to various aspects of the present disclosure.

In the embodiment illustrated in FIG. 2, the process tool 80 performs semiconductor processes that form an active region of a semiconductor device, the process tool 81 performs semiconductor processes that form a shallow trench isolation of the semiconductor device, and the process tool 82 performs semiconductor processes that form a polysilicon region of the semiconductor device. The tools 80, 81, and 82 respectively receive as inputs the target values of OD_CD, STI_SH, and POLY_CD from the device parameter modeling module 60. The tools 80, 81, and 82 are programmed to carry out their respective semiconductor fabrication processes in a manner so that the actual values of these process parameters may approach their intended target values. Metrology tools 90, 91, and 92 are respectively coupled to outputs of the process tools 80, 81, and 82, and measure the actual values of the process parameters OD_CD, STI_SH, and POLY_CD, respectively.

However, often times the actual values of the process parameters will deviate or drift away from their intended target values. Traditionally, such deviation or drift is not taken into account by subsequent fabrication processing stages. For example, the actual value of the process parameter OD_CD may deviate from the target value of OD_CD that was received as an input by the process tool 80 from the device parameter modeling module 60. In traditional fabrication processes, this deviation in OD_CD is not taken into account by the process tool 81. As such, the process tool 81 operates as if the process parameter OD_CD is on target. Further, the actual value of the process parameter STI_SH (associated with the process tool 81) itself may also deviate from its intended target value. Each of the process parameter deviations contribute to deviations of the device parameter. Thus, in traditional fabrication processes, even small deviations from each processing stage may accumulate over multiple processing stages, such that they may cause a substantial deviation with respect to the value of the device parameter.

In the present embodiment, however, dynamic compensation after each processing stage is utilized to compensate for process deviations that may occur in each processing stage. In more detail, the actual value of the process parameter OD_CD is measured using the metrology tool 90. The measured value of OD_CD is then sent to the device parameter modeling module 60 to update the model. The measured actual value of OD_CD replaces the target value of OD_CD that was initially calculated to derive the desired value of the device parameter. Based on the actual value of the process parameter OD_CD, a revised target value of the process parameter STI_SH is calculated. Before processing is performed by the process tool 81, the revised target value of the process parameter STI_SH is sent to the process tool 81. The process tool 81 will then use the revised target value of STI_SH as an input and will carry out the semiconductor fabrication processes in accordance with the revised STI_SH value.

After the fabrication processes are performed by the process tool 81, an actual value of the process parameter STI_SH is measured using the metrology tool 91. The measured value of the process parameter STI_SH is then sent to the device parameter modeling module 60 to replace the previously calculated value of STI_SH that was outputted by the device parameter modeling module 60 and received by the process tool 81 as an input. Based on the actual measured value of the process parameter STI_SH, a revised target value of the process parameter POLY_CD is calculated. Before processing is performed by the process tool 82, the revised target value of the process parameter POLY_CD is sent to the process tool 82. The process tool 82 will then use the revised target value of POLY_CD as an input and will carry out the semiconductor fabrication processes in accordance with the revised POLY_CD value.

After the fabrication processes are performed by the process tool 82, an actual value of the process parameter POLY_CD is measured using the metrology tool 92. The measured value of the process parameter POLY_CD is then sent to the device parameter modeling module 60 to replace the previously calculated value of POLY_CD. Afterwards, based on the actual measured value of the process parameter POLY_CD, a revised target value of a process parameter for a subsequent processing stage (not illustrated) is calculated. This revised process parameter value is then used to adjust the fabrication processes of that following stage in the manner similar to those discussed above with respect to process tools 80-82.

This compensation process described above continues until the wafer undergoing semiconductor fabrication completes a wafer acceptance test. The wafer acceptance test is performed using a wafer acceptance test tool 100 and is typically done at a wafer level to measure the performance of the wafer as a whole. If the wafer fails the wafer acceptance test, the entire wafer may be discarded. One of the parameters measured by the wafer acceptance test tool 100 is the device parameter saturation drain current $I_{dsat}$. The measured value of $I_{dsat}$ is sent back to the device parameter modeling module 60. Taking into account the measured $I_{dsat}$, the modeling equation expressing $I_{dsat}$ as a function of the process parameters OD_CD, STI_SH, and POLY_CD may be adjusted. For example, the coefficients of the process parameters OD_CD, STI_SH, and POLY_CD may be adjusted to account for the new $I_{dsat}$ value. The adjusted modeling equation of $I_{dsat}$ may then be used for further wafer processing in the future.

The above discussions pertain to a full-loop operation (also referred to as a whole node operation) since the device parameter as well as the individual process parameters are constantly updated and compensated in response to actual measured results obtained from all the process tools within the APC system 50. In other words, the device parameter and the process parameters are inter-related to one another. In another embodiment known as a mini-loop operation (also referred to as a fixed node operation), the updating and compensating of the device parameter and the process parameter occur only at selected portions of the APC system 50. As an example of the mini-loop embodiment, the process tools 80 and 81 do not send the actual measured values of the respective process parameters OD_CD and STI_SH to the device parameter modeling module 60. Thus, the modeling equation for the device parameter $I_{dsat}$ is not updated as the wafer is processed by the process tool 80 and 81. The inputs to the process tools 81 and 82 are the initially calculated values of the process parameters STI_SH and POLY_CD that are derived from the initial modeling equation for $I_{dsat}$. After the wafer is processed by the process tool 82 and the process parameter POLY_CD is measured, the actual measured value of POLY_CD is sent back to the device parameter modeling module 60 to update the model equation and to calculate a revised parameter for the subsequent processing stage.

The APC system 50 also includes APC optimizer modules 110, 111, and 112 that are optionally implemented. The APC optimizer modules 110, 111, and 112 have respective inputs that are respectively coupled to the metrology tools 80, 81, and 82. The APC optimizer modules 110, 111, and 112 also receive inputs from the device parameter modeling module 60. The APC optimizer modules 110, 111, and 112 have outputs that are respectively coupled to inputs of the process tools 80, 81, and 82.

The APC optimizer modules 110, 111, and 112 may each include one or more computers that can be a conventional, commercially-available computers, or any other suitable computer hardware. The hardware may include a processors, controllers, and memory storage devices. The memory storage devices store computer programs that when executed, perform actions including manipulating information (including manipulating information using a model), receiving information, storing information, and transferring information. The information may include, for example, commands, process parameters such as those parameters used in the process recipe, measurement data, process data such as the history of processes ran including specific tool or tool sector used and process parameters used, and/or equipment status. In this manner, the APC optimize modules 110, 111, and 112 are operable to control the process tools 80, 81, and 82, respectively. The APC optimizer modules 110, 111, and 112 may also include user interfaces that allow users to adjust the APC optimizer modules.

The APC optimizer modules are used to fine tune the process tools 80, 81, and 82. As an example, the APC optimizer module 111 receives the actual measured value of the process parameter STI_SH from the metrology tool 91. The APC optimizer also receives the target value of STI_SH and the actual measured value of the process parameter OD_CD from the device parameter modeling module 60. Based on these values, the APC optimizer module 111 can calculate a optimized value STI_SH in order to carry out the fabrication process in a manner to ensure that the device parameter will reach its target value. In other words, the APC optimizer module 111 can make further adjustments to the revised target value of STI_SH that is calculated and outputted by the device parameter modeling module 60. In alternative embodiments, the APC optimizer module 111 may not receive all of the target value of STI_SH, the actual value of STI_SH, and the actual value of OD_CD. Instead, the APC optimizer module 111 receives a subset of these values of STI_SH and OD_CD, and optimizes STI_SH based on the subset of values.

In a similar fashion, the process parameters OD_CD and POLY_CD can be optimized. In an embodiment, each APC optimizer module receives as inputs the target value and actual value of the process parameter associated with the process tool (and processing stage) that the APC optimizer module is optimizing, as well as the actual value of the process parameter associated with the process tool that is used in the prior processing stage. In an embodiment where the process tool 80 is used in the first processing stage—meaning that no processing is performed before the wafer is processed by the process tool 80—the APC optimizer module 110 would not receive any actual values of process parameters associated with a previous processing stage, since there are none. In this manner, the APC optimizer modules 110, 111, and 112 provide additional dynamic process compensation for the APC system 50. It is also understood that the optimized process parameters may be used to adjust the processing of subsequent wafers.

FIG. 2 is a flowchart of a method 200 in accordance with an embodiment of the present disclosure. The method begins with block 205 in which a model for a device parameter of a wafer is provided as a function of first and second process parameters. The first and second process parameters correspond to different wafer characteristics, respectively. The method 200 continues with block 210 in which target values of the first and second process parameters are derived based on a specified target value of the device parameter. The method 200 continues with block 215 in which a first fabrication process is performed in response to the target value of the first process parameter. The method 200 continues with block 220 in which an actual value of the first process parameter is measured. The method 200 continues with block 225 in which the model is updated using the actual value of the first process parameter. The method 200 continues with block 230 in which a revised target value of the second process parameter is derived using the updated model. The method 200 continues with block 235 in which a second fabrication process is performed in response to the revised target value of the second process parameter.

The foregoing discussions illustrate an advantage of the embodiments disclosed herein over traditional fabrication processes, in that the embodiments disclosed herein utilize dynamic compensation to resolve the issue of process deviations that may occur in each processing stage. As such, an actual device parameter value may reach its intended target even though each of the process parameters associated with the processing stages may deviate from their intended targets. Therefore, wafer performance and yield may be improved. It is also understood that different embodiments of the present disclosure may offer different advantages, and that no particular advantage is required for all embodiments.

The discussions above involve an APC system in a semiconductor fabrication process, but it is understood that the disclosed technique may be alternatively used to control a process in an application other than semiconductor fabrication. Although only a few exemplary embodiments of this invention have been described in detail above, those skilled in the art will readily appreciate that many modifications are possible in the exemplary embodiments without materially departing from the novel teachings and advantages of this invention. It is understood that various different combinations of the above-listed steps can be used in various sequences or in parallel, and there is no particular step that is critical or required. Also, features illustrated and discussed above with respect to some embodiments can be combined with features illustrated and discussed above with respect to other embodiments. Accordingly, all such modifications are intended to be included within the scope of this invention.

What is claimed is:

1. A method, comprising:
providing a model for a device parameter of a wafer as a function of first and second process parameters, the device parameter corresponding to an electrical wafer characteristic, and the first and second process parameters corresponding to different physical wafer characteristics, respectively;
deriving target values of the first and second process parameters based on a specified target value of the device parameter;
performing a first fabrication process on the wafer in response to the target value of the first process parameter;
thereafter measuring an actual value of the first process parameter obtained as a result of the first fabrication process;
updating the model using the actual value of the first process parameter;
deriving a revised target value of the second process parameter using the updated model;
performing a second fabrication process on the same wafer in response to the revised target value of the second process parameter; and
thereafter measuring an actual value of the device parameter;
wherein the updating the model and the deriving the revised target value are performed so that the measured actual value of the device parameter substantially approaches the specified target value of the device parameter.

2. The method of claim 1, wherein the model includes an equation that is: $DP = a_1 * P_1 + a_2 * P_2 + b$, wherein DP represents the device parameter, $P_1$ and $P_2$ respectively represent the first and second process parameters, $a_1$ and $a_2$ are coefficients, and b is a constant.

3. The method of claim 1, wherein the model is provided so that the device parameter is also a function of a third process parameter, and further including:
after the performing the second fabrication process and before the measuring the actual value of the device parameter, measuring an actual value of the second process parameter obtained as a result of the second fabrication process;
further updating the model using the actual value of the second process parameter;

deriving a revised target value of the third process parameter using the further updated model; and performing a third fabrication process on the same wafer in response to the revised target value of the third process parameter.

4. The method of claim 1, wherein:

the device parameter includes one of saturation drain current, threshold voltage, trans-conductance, trans-resistance, saturation drain current uniformity, threshold voltage uniformity, trans-conductance uniformity, and trans-resistance uniformity; and the process parameter includes one of active region critical dimension, shallow trench isolation step height, polysilicon region critical dimension, offset spacer width critical dimension, rapid thermal annealing temperature, gate oxide thickness, and pocket implant dose.

5. The method of claim 1, further including:

updating the model using the measured actual value of the device parameter.

6. The method of claim 5, further including thereafter using the updated model to control processing of a further wafer.

7. The method of claim 1, further including optimizing one of: the target value of the first process parameter and the target value of the second process parameter.

8. The method of claim 1, further including:

determining an optimized target value of the first process parameter in response to one of: the target value of the first process parameter, the actual value of the first process parameter, and combinations thereof; and determining an optimized target value of the second process parameter in response to one of: the target value of the second process parameter, the actual value of the second process parameter, the actual value of the first process parameter, and combinations thereof.

9. A method of fabricating a semiconductor device, comprising:

determining a target value of a first parameter based on a target value of a second parameter;

operating a first fabrication tool to process a wafer in response to the target value of the first parameter;

thereafter measuring an actual value of the first parameter obtained as a result of the operating the first fabrication tool;

determining a target value of a third parameter based on the target value of the second parameter and the actual value of the first parameter;

operating a second fabrication tool to process the same wafer in response to the target value of the third parameter; and thereafter measuring an actual value of the second parameter;

wherein the second parameter is a function of the first and third parameters, and wherein the first and third parameters correspond to physical characteristics of a semiconductor wafer, and the second parameter corresponds to an electrical characteristic of the semiconductor wafer.

10. The method of claim 9, wherein the function is expressed as: the second parameter=$a_1$*(the first parameter)+$a_2$*(the third parameter)+b, wherein $a_1$ and $a_2$ are coefficients, and b is a constant; and wherein the operating the first fabrication tool and the operating the second fabrication tool are carried out on a first semiconductor wafer; and further including:

determining a revised target value of the first parameter based on the target value of the first parameter and the actual value of the first parameter;

operating the first fabrication tool on a second semiconductor wafer in response to the revised target value of the first parameter, the second semiconductor wafer being different from the first semiconductor wafer;

determining a revised target value of the third parameter based on the target value of the third parameter, the actual value of the third parameter, and the actual value of the first parameter; and operating the second fabrication tool on the second semiconductor wafer in response to the revised target value of the third parameter.

11. The method of claim 9, wherein the operating the first fabrication tool and the operating the second fabrication tool are carried out on a first semiconductor wafer, and further including:

determining revised target values of the first and third parameters, respectively; and operating the first and second fabrication tools on a second semiconductor wafer in response to the revised target values of the first and third parameters, respectively, the second semiconductor wafer being different from the first semiconductor wafer.

12. The method of claim 9, wherein the measuring the actual value of the first parameter is performed using a different tool than the measuring the second parameter.

13. The method of claim 12, wherein the measuring the actual value of the first parameter is performed using a metrology tool, and wherein the measuring the actual value of the second parameter is performed using a wafer acceptance tool.

14. A system for semiconductor fabrication, comprising:

a modeling module that establishes a model for a device parameter of a wafer, the model being a function of first and second process parameters that correspond to respective different wafer characteristics, the model deriving target values of the first and second process parameters based on a specified target value of the device parameter, wherein the device parameter corresponds to an electrical characteristic of the wafer, and the process parameters correspond to respective physical characteristics of the wafer;

a first process tool coupled to the modeling module, the first process tool performing a first fabrication process on the wafer in response to the target value of the first process parameter;

a metrology tool coupled to the first process tool and the modeling module, the metrology tool measuring an actual value of the first process parameter obtained as a result of the first fabrication process performed on the wafer;

a second process tool coupled to the modeling module, the second process tool performing a second fabrication process on the same wafer in response to a revised target value of the second process parameter; and a wafer acceptance test tool coupled to the modeling module, the wafer acceptance test tool measuring an actual value of the device parameter after the first and second fabrication processes have been performed on the wafer;

wherein the revised target value of the second process parameter is derived by the modeling module based on the actual value of the first process parameter.

15. The system of claim 14, wherein the model includes an equation that is: DP=$a_1$*$P_1$+$a_2$*$P_2$+b, wherein DP represents the device parameter, $P_1$ and $P_2$ respectively represent first and second process parameters, $a_1$ and $a_2$ are coefficients, and b is a constant.

16. The system of claim 14, wherein:
   the device parameter includes one of saturation drain current, threshold voltage, trans-conductance, trans-resistance, saturation drain current uniformity, threshold voltage uniformity, trans-conductance uniformity, and trans-resistance uniformity; and
   the process parameter includes one of active region critical dimension, shallow trench isolation step height, polysilicon region critical dimension, offset spacer width critical dimension, rapid thermal annealing temperature, gate oxide thickness, and pocket implant dose.

17. The system of claim 14, further including:
   wherein the modeling module updates the model using the actual value of the device parameter.

18. The system of claim 17, wherein the modeling module uses the updated model to control processing of a further wafer.

19. The system of claim 14, further including an optimizing module coupled to the modeling module, the optimizing module optimizing one of: the target value of the first process parameter and the target value of the second process parameter.

20. The system of claim 19, wherein the optimizing module is coupled to the first process tool and optimizes the target value of the first process parameter in response to one of: the target value of the first process parameter, the actual value of the first process parameter, and combinations thereof; and further including:
   a further metrology tool coupled to the second process tool, the further metrology tool measuring an actual value of the second process parameter; and
   a further optimizing module that is coupled to the modeling module and the second process tool, the further optimizing module optimizing the target value of the second process parameter in response to one of: the target value of the second process parameter, the actual value of the second process parameter, the actual value of the first process parameter, and combinations thereof.

* * * * *